April 19, 1960   J. O. CAMPBELL ET AL   2,933,726
SYSTEM AND APPARATUS FOR PREVENTING
COLLISIONS BETWEEN VEHICLES
Filed July 25, 1957   3 Sheets-Sheet 1

INVENTORS.
JOHN O. CAMPBELL,
YEE J. LIU
BY Harold L. Jackson
ATTORNEY.

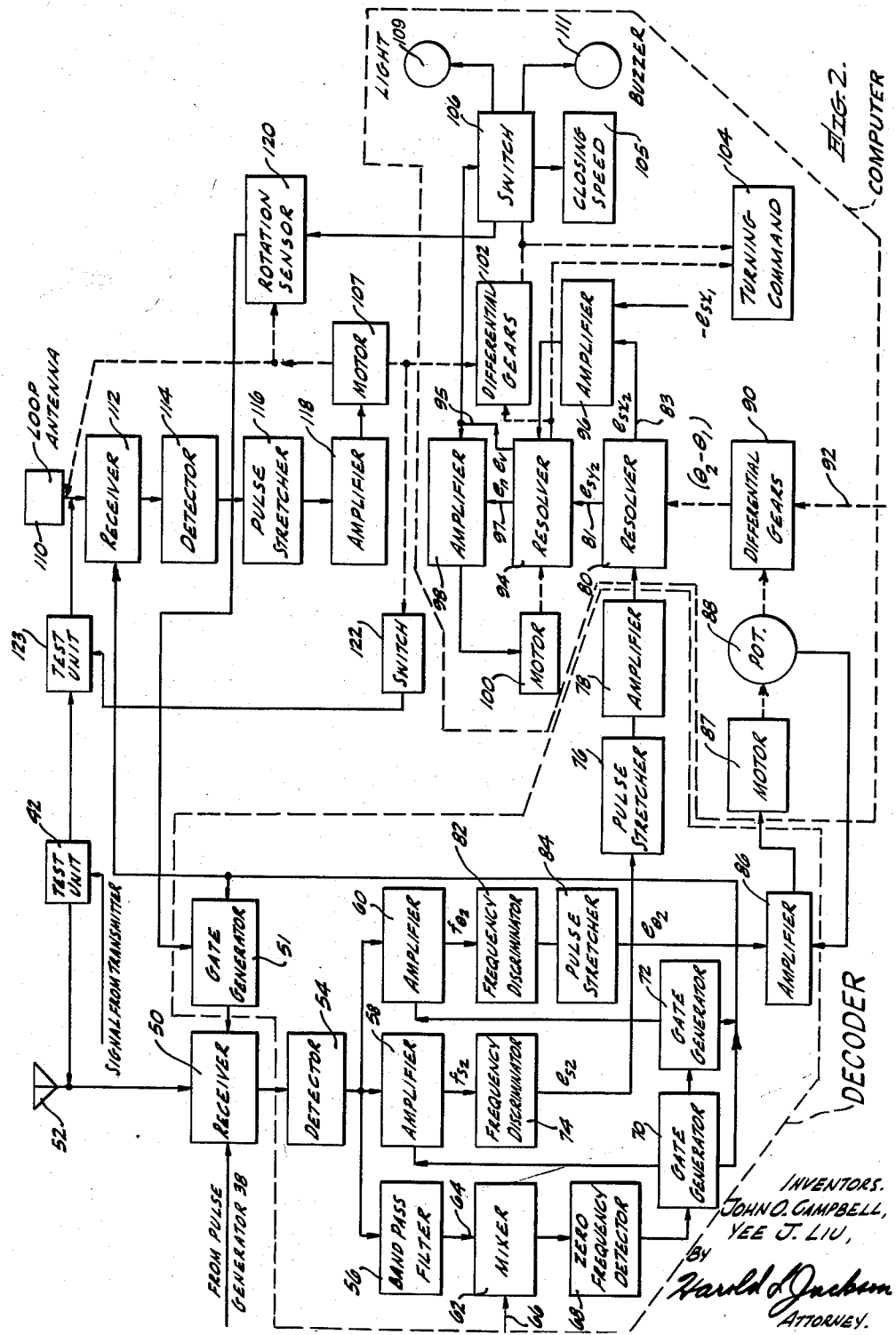

INVENTORS.
JOHN O. CAMPBELL,
YEE J. LIU
BY
Harold L Jackson
ATTORNEY.

United States Patent Office 2,933,726
Patented Apr. 19, 1960

2,933,726

SYSTEM AND APPARATUS FOR PREVENTING COLLISIONS BETWEEN VEHICLES

John O. Campbell and Yee J. Liu, Los Angeles, Calif., assignors to Aerosystronics Corporation, Los Angeles, Calif., a corporation of California Application July 25, 1957, Serial No. 674,140

21 Claims. (Cl. 343—112)

The present invention relates to a system for preventing collisions between moving vehicles, and more particularly to a system and apparatus for preventing collisions between aircraft during flight.

The midair collision problem is becoming increasingly serious as a result of the increasing number and speed of aircraft that are simultaneously in the air. This problem exists during en-route cruising flight as well as in landing and take-off operations. While humans are largely responsible today for preventing such collisions, human capabilities alone are inadequate because of the limitations upon visibility of the human eye and the limitations of human reflexes and aircraft maneuvering capabilities when considered with reference to the very short time intervals that are available when human sight alone is relied upon to detect the presence of other aircraft.

It is an object of the present invention to provide a system and apparatus for automatically giving warning as to the proximity of a possible collision between two moving vehicles.

It is another object of the present invention to provide a radio communication system between the aircraft to be protected from midair collisions for automatically determining possibility of a collision with another airplane, and warning the pilot or operator of an airplane when a collision may be in the making.

It is a further object of the present invention to provide a system of the cooperative type for protecting aircraft from midair collisions in which means are carried by each aircraft for selectively establishing radio communications with other aircraft in the vicinity to appraise each aircraft of the flight pattern of all other aircraft in this vicinity, and for automatically determining whether any of the aircraft may be flying collision courses and for preventing a collision with the other aircraft.

The necessary conditions for straight line collisions between two aircraft are; the time rate of change of the range between the two aircraft must be constant; the angular rate of rotation of the line of sight must be zero; and the direction of the relative velocity between the two aircraft must coincide with the direction of the line of sight.

The present invention utilizes the parameters of the third condition as set forth above, e.g., the directions of the relative velocity and the line of sight between two aircraft to protect two aircraft from midair collisions.

Accordingly, the present invention provides a system of the cooperative type for preventing collisions between two vehicles such as two aircraft. A first aircraft is equipped with means including a transmitter for periodically transmitting signals representative of the speed and heading of the first aircraft. A second aircraft is equipped with means including a receiver for selectively receiving the signals transmitted by the first aircraft. The second aircraft is also equipped with a computer responsive to the signals representative of the speed and heading of the first aircraft and to signals representative of the speed and heading of the second aircraft for deriving the relative velocity between the first and second aircraft. Means are carried by the second aircraft for determining whether the direction of the relative velocity between the two aircraft is within a predetermined angle of the line of sight between the two aircraft, whereby an appropriate warning or command maneuver may be effected with respect to the second aircraft if the directions of the relative velocity and the line of sight are within a few degrees.

The present invention represents a departure from the radar tracking type of systems which have been used extensively in many types of fire control systems and also for controlling aircraft flight in the vicinity of airports. The present invention requires no attention from the pilots of aircraft, it does not depend upon a visual display, it is instantaneous in operation and is fully automatic.

The novel features which are believed to be characteristic of the invention both as to its organization and method of operation, together with the further objects and advantages thereof will be better understood from the following description considered in connection with the accompanying drawings in which:

Fig. 2 is a detail block diagram of a receiver, decoder and computer embodying the principles of the present invention;

Figure 1:
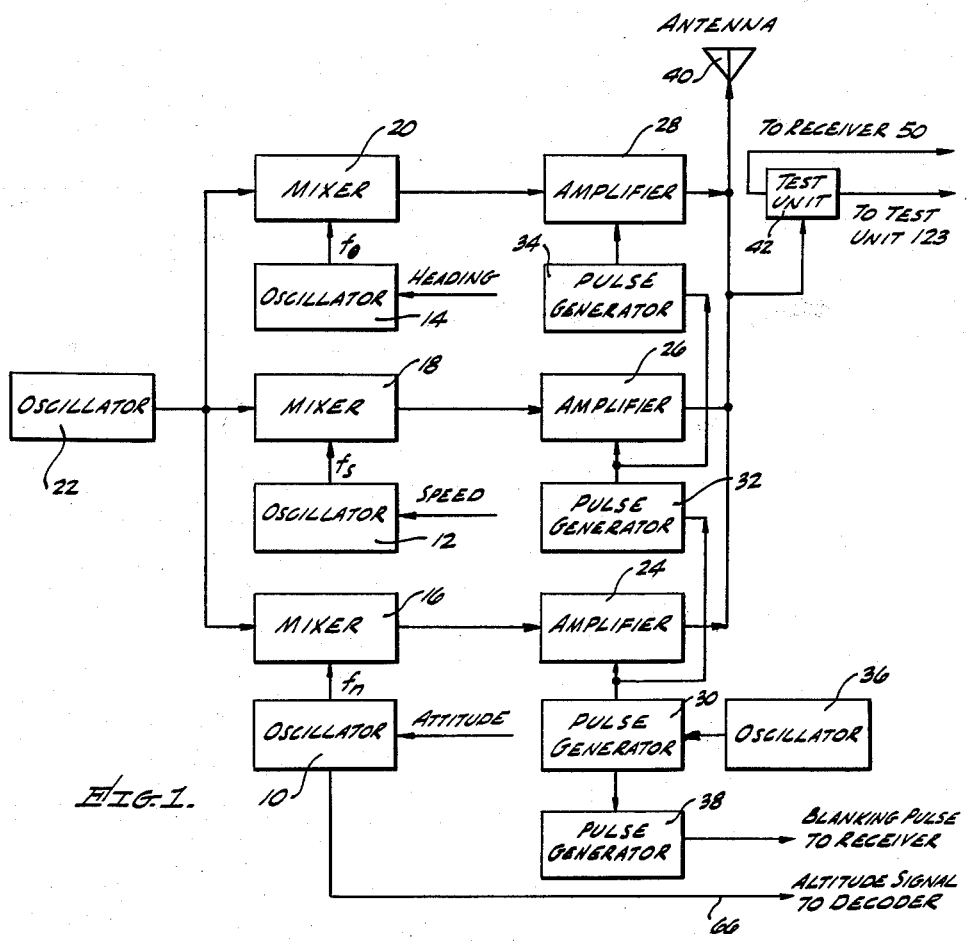
Fig. 1 is a detail block diagram of a transmitter and coder unit embodying the principles of the present invention.

Referring now to the drawing wherein like elements are designated by the same reference characters throughout the figures, and particularly to Fig. 1, each aircraft to be protected is provided with a transmitter which includes an altitude oscillator 10, a speed oscillator 12 and a heading oscillator 14. An electric signal representative of the altitude of the aircraft carrying the transmitter is coupled to the altitude oscillator 10 to shift the frequency of this oscillator so that its output frequency $f_{h_1}$ corresponds to the altitude of the aircraft. Signals representative of the speed and heading are fed to the input circuits of the speed and heading oscillators 12 and 14 to shift the frequencies of these oscillators so that their output signals $f_{s_1}$ and $f_{\theta_1}$ respectively, correspond to the speed heading of the aircraft. Three separate mixers 16, 18 and 20 have one of their input circuits connected in the output circuits of the altitude, speed and heading oscillators respectively for mixing the output frequencies of these oscillators with a suitable carrier frequency that is produced by a carrier frequency oscillator 22. As is shown, the carrier frequency oscillator is connected to the other input circuit of the mixers.

The modulated carrier waves developed in the output circuits of the mixers 16, 18 and 20 are applied to three amplifiers 24, 26 and 28 respectively, to be amplified thereby. Three pulse generators 30, 32 and 34 are connected to the amplifiers 24, 26 and 28 respectively, for gating or keying the amplifiers on. The output signals of the pulse generators 30 and 32 are also fed to the input circuits of the pulse generators 32 and 34 respectively, to gate on the speed and heading channels as will be explained. A repetition rate oscillator 36 is connected to the pulse generator 30 for controlling the repetition rate of the keying pulse produced by the generator 30. The pulse generator 30 is also connected to another pulse generator 38 which in turn blanks the receiver (shown in Fig. 2) by means of a suitable blanking pulse. The output signals from the amplifiers 24, 26 and 28 are transmitted by means of a suitable antenna 40. A first testing unit 42 is also provided on the transmitter for testing the operation of the system as will be explained later.

The operation of the transmitter shown in Fig. 1 is as follows:

The altitude, speed and heading of the aircraft carrying the transmitter are measured by suitable means such as a pressure altimeter, a Pitot tube and a compass respectively and are converted into direct current (D.C.) voltages by means of suitable transducers. These D.C. voltages or signals are fed into the oscillators 10, 12 and 14 to shift the frequencies $f_{h_1}$, $f_{s_1}$ and $f_{\theta_1}$ respectively, correspond to the altitude, speed and heading of this aircraft. This type of frequency shifting is well known in the art. For example, where reactance tubes are utilized as one of the active elements in the oscillators 10, 12 and 14, the D.C. voltages representative of the heading, speed and altitude may be coupled to the grids of these reactance tubes to suitably shift the frequencies of the oscillators.

The output signals of the three oscillators 10, 12 and 14 are beaten individually in the mixers 16, 18 and 20 with that of the carrier frequency from the oscillator 22. The frequencies chosen for the various oscillators may vary according to design, but the frequencies of the heading, speed and altitude oscillators may conveniently be within the range of 0.1 to 1.0 megacycles per second while the frequency of the carrier frequency oscillator may be several hundred megacycles. The coded pulses of R.F. energy representative of the altitude, speed and heading of the aircraft are sequentially transmitted, as will be explained and therefore the oscillators 12 and 14 for generating the speed and heading frequencies $f_{s_1}$ and $f_{\theta_1}$ respectively, may operate at the same frequency. However, the oscillator 10 which generates the altitude frequency $f_{h_1}$ should operate at a different frequency than that of the speed and heading oscillators because a band pass filter is utilized to separate the frequency band representing the altitude of the aircraft as will be described in connection with Fig. 2.

The output signals from the mixers 16, 18 and 20 are amplified and fed to the transmitting antenna by the amplifiers 24, 26 and 28. These amplifiers are normally biased off and are rendered operative to translate the output signals from the mixers by a trigger pulse from the pulse generators 30, 32 and 34. The pulse repetition rate oscillator 36 produces the trigger pulse which triggers the pulse generator 30. When triggered, this pulse generator produces a keying pulse which renders the altitude amplifier 24 operative for a time $\tau$. The trailing edge of the keying pulse from the generator 30 triggers the pulse generator 32 which in turn produces a keying pulse and renders the amplifier 26 operative which translates the speed information for a time $\tau$ also. In like manner the amplifier 28 which translates the heading information is keyed on by the trailing edge of the keying pulse from the pulse generator 32. Hence, three pulses of frequency modulated R.F. energy are sequentially fed to the antenna 40 and thereby transmitted. These three pulses are characteristic of the altitude, speed and heading of the aircraft carrying the transmitter in frequency coded form.

Referring now to Fig. 2, there is shown a receiver, decoder and computer which embodies the principles of the present invention. The most optimum protection is achieved by equipping each aircraft to be protected with such a receiver, decoder and computer. However, it is not necessary to so equip each aircraft, but as will be explained, it is necessary that at least one of every two aircraft between which it is desired to prevent collisions, be provided with such a unit. As is shown in this figure, a receiver 50 of the superheterodyne type is provided with a suitable antenna 52. The receiver 50 is also connected to the pulse generator 38 of the transmitter and to a disabling gate generator 51. The pulse generator 38 supplies a blanking pulse to the receiver 50 during the time interval $3\tau$ that the transmitter is keyed on to render the receiver inoperative during this time. The gate generator 51 supplies another blanking or disabling pulse to the receiver 50 as will be explained.

The output of the receiver 50 is fed to a detector 54 and the output signal of the detector is fed to a band pass filter 56, a first speed amplifier 58 and a first heading amplifier 60. An altitude mixer 62 is provided with a pair of input circuits 64 and 66. The input circuit 64 is connected to the output circuit of the band pass filter 56 and the input circuit 66 is connected to an oscillator for deriving an alternating current (A.C.) signal whose frequency is characteristic of the altitude of the plane carrying the receiver or the receiving aircraft. For convenience, the oscillator 14 of the transmitter shown in Fig. 1 is utilized to provide the signal to the input circuit 64. A zero frequency detector 68 is connected to the output circuit of the mixer 62 for deriving an output signal therefrom when the difference between the frequencies of the two input signals to the mixer 62 is within a predetermined frequency range.

A speed channel gate generator 70 is connected to the zero frequency detector 68 and the input circuit of a heading channel gate generator 72 is connected to the gate generator 70 to be controlled thereby. A speed channel frequency discriminator 74 is connected to the first speed amplifier 58 for deriving an output signal therefrom, and one of the output circuits of the speed channel gate generator 70 is connected to the amplifier 58 for rendering this amplifier operative in accordance with the signal output from the zero frequency detector as will be explained. The output signal from the speed channel frequency discriminator 74 is fed to a pulse stretcher 76 and is amplified by a second speed amplifier 78 and then fed to an electrical input circuit of a resolver 80. As is shown, the amplifier 78 is connected in the output circuit of the pulse stretcher 76 and the resolver 80 is connected in the output circuit of the amplifier 78. The pulse stretcher 76 may comprise a conventional box car circuit and serves the purpose of stretching the pulse derived from the frequency discriminator 76 to provide a D.C. signal having an amplitude equal to that of the pulse derived from the discriminator in the output circuit of the pulse stretcher. One such box car circuit is disclosed in "Threshold Signal," vol. 24 of the Radiation Laboratory Series, pages 258 and 260.

The heading information from the transmitting aircraft or the aircraft whose signals are being received by the receiver 50 is translated by the first heading amplifier 60 and fed to a heading channel frequency discriminator 82. This first heading amplifier 60 is also connected to the heading channel gate generator 72 to be controlled thereby. The amplifier 60 is rendered operative to amplify the detected signal representative of the heading of the transmitting aircraft only when a suitable gating pulse is produced by the gate generator 72. A heading channel pulse stretcher 84 is connected in the output circuit of the frequency discriminator 82 and the output signal from the pulse stretcher is fed to a second heading amplifier 86. The pulse stretcher 84 may also consist of a conventional box car circuit and performs the same function as the pulse stretcher 76. The amplifier 86 may be a conventional D.C. differential amplifier for amplifying the difference between two voltages. This amplifier is provided with two input circuits, one of which is connected to the pulse stretcher 84 and the other of which is connected to the output circuit of a potentiometer 88. A motor 87 is connected between the amplifier 86 and the potentiometer 88 for driving the potentiometer until the output voltages from the potentiometer 88 and the pulse stretcher 84 are equal.

The shaft of the potentiometer 88 is mechanically coupled to one input of a first differential gearing unit 90. Another shaft 92 whose rotational position is proportional to the heading of the receiving aircraft is coupled to the other input of this differential gearing unit. The shaft 92 may conveniently be coupled to a compass or other suitable instrument for providing a shaft rotation which is proportional to the heading of the receiving aircraft. The output shaft of the differential gearing unit 90 is connected to the rotatable shaft of the resolver 80. One of the electrical output circuits 81 of the resolver 80 is connected to one of the electrical input circuits of the second resolver 94 and the other electrical output circuit 83 of the resolver 80 is connected to one input circuit of an amplifier 96. This amplifier may be a conventional D.C. summing amplifier and performs the function of obtaining the sum of two D.C. voltages.

An electrical signal of negative polarity and representative of the speed of the aircraft carrying the receiver is applied to the second input circuit of the summing amplifier 96. This negative signal, designated by $-e_{s_{x_1}}$, is representative of the air speed of the receiving aircraft and may be obtained by means of a Pitot tube and a suitable transducer. The output signal from the summing amplifier 96 is fed to the second electrical input circuit of the resolver 94. The resolver 94 is provided with two electrical output circuits 95 and 97. The output circuit 95 is connected to a servo amplifier 98 for controlling the gain of this amplifier and the output circuit 97 is connected to the input circuit of the amplifier 98 for amplification thereby. The output circuit 95 is also connected to a second testing unit 123 such as a relay. This second testing unit is also connected between the output circuit of the first testing unit and the input circuit to the direction finding receiver.

Figure 3:
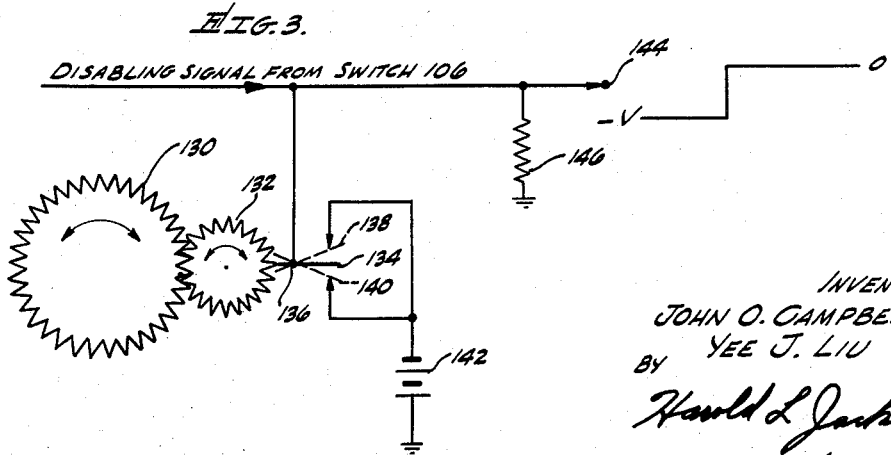
Fig. 3 is a schematic diagram of one embodiment of a rotation sensor utilized in the computer of the present invention.

Referring now to Fig. 3, the rotation sensor 120 may comprise a pair of meshed gears 130 and 132. The gear 130 is connected with the drive shaft of the motor 107 to be driven thereby. The gear 132 which is smaller in diameter than the gear 130 is provided for amplifying the movements of the gear 130. An electrically conductive arm 134 is meshed with the teeth of the gear 132 so that when the gear 132 rotates the arm 134 will pivot about a point 136. The arm 134 is designed to swing between and selectively make contact with one of a pair of electrical contacts 138 and 140, depending upon the direction of rotation of the gear 132. The contacts 138 and 140 are connected to the negative terminal of a suitable source of energizing potential 142 which may be a battery. The arm 134 is electrically connected to an output terminal 144 and a resistor 146 is connected between this output terminal and ground.

The operation of the receiver, decoder and computer unit of Fig. 2 will now be described. The receiver 50 receives frequency coded pulse signals representative of the altitude, speed and heading of another aircraft which will be referred to hereafter as the transmitting aircraft. These pulse signals are fed to the detector 54 and the modulations of these signals are extracted by the detector so that the output signals from the detector 54 are pulses whose frequencies are $f_{h_2}$, $f_{s_2}$, and $f_{\theta_2}$ which represent the characteristic frequencies of the altitude, speed and heading of the transmitting aircraft respectively. A pulse of R.F. energy representing the altitude of the transmitting aircraft arrives first is detected and the frequency $f_{h_2}$ representing the altitude of the transmitting aircraft is passed through the band pass filter 56. The output signal from the band pass filter is mixed in the mixer 62 with that of a signal $f_{h_1}$ representing the altitude of the aircraft carrying the receiver or the receiving aircraft. The signal resulting in the output circuit of the mixer 62 has a frequency equal to $f_{h_1}-f_{h_2}$. This signal is fed to the zero frequency detector 68. If the altitude difference between the transmitting and the receiving aircraft is within a predetermined range of altitudes such that a collision could occur, then a signal is developed in the output circuit of the zero frequency detector which is of sufficient magnitude to trigger the gate generator 70.

This gate generator 70 in turn triggers the first speed channel amplifier 58 and unblanks this amplifier for a sufficient time to permit the speed portion of the received signal to pass through this amplifier. Since the transmitted pulse that is representative of the speed of the transmitting aircraft has a duration of time of $\tau$ this first speed channel amplifier is triggered for a time $\tau$ also. The trailing edge of the gating pulse from the gate generator 70 is fed to the gate generator 72 and triggers this gate generator which in turn unblanks the first heading channel amplifier 60 for a time $\tau$ also to permit the heading portion of the received signal to pass through this amplifier. In this manner only signals from transmitting aircraft which are at altitudes that could result in a collision with the receiving aircraft are admitted into the computer.

Both the received speed and heading frequencies $f_{s_2}$ and $f_{\theta_2}$ respectively, are kept out of the altitude mixer 62 by means of the band pass filter 56.

The output signal from the first speed amplifier 58 is fed into the frequency discriminator 74 and there results a video pulse of duration $\tau$ and amplitude $e_{s_2}$ in the output circuit of the frequency discriminator 74 which is proportional to the speed of the transmitting aircraft. This output signal is fed to the pulse stretcher 76 to provide an output signal in the pulse stretcher which is a D.C. voltage having a magnitude $e_{s_2}$. In like manner, the output signal from the amplifier 60 being characteristic of the heading of the transmitting aircraft is fed to the frequency discriminator 82. The output signal from the frequency discriminator 82 is fed to the pulse stretcher 84 to provide a D.C. voltage in the output circuit of the pulse stretcher 84 having a magnitude $e_{\theta_2}$ which is proportional to the heading of the transmitting aircraft.

The D.C. voltage in the output circuit of the pulse stretcher 76 is amplified by the amplifier 78 and applied to the electrical input circuit of the resolver 80. The D.C. output voltage from the pulse stretcher 84 is applied to the differential amplifier 86 which in turn applies a voltage to the motor 87 for driving the potentiometer 88 until the voltage in the output circuit of the potentiometer 88 is equal to the voltage in the output circuit of the amplifier 86. In this manner the voltage $e_{\theta_2}$ is utilized to turn the shaft of the potentiometer 88 until the rotational position thereof corresponds to the heading of the transmitting aircraft. The rotational position of the shaft 92 which is representative of the heading of the receiving aircraft is subtracted from the rotational position of the shaft of the potentiometer 88 in the differential gearing unit 90 to provide an output shaft position of the differential gearing arrangement 90 which is proportional to the difference in the headings $(\theta_2-\theta_1)$ of the transmitting and the receiving aircraft. This heading angle difference $(\theta_2-\theta_1)$ is mechanically coupled to the rotatable shaft of the resolver 80. The input voltage to this resolver is a D.C. voltage $e_{s_2}$ which is proportional to the speed of the transmitting aircraft and the output voltages $e_{s_{x_2}}$ and $e_{s_{y_2}}$ of the resolver 80 are proportional respectively to the longitudinal and lateral components of the transmitting aircraft's velocity with reference to the heading of the receiving aircraft. The longitudinal component $e_{s_{x_2}}$ being in the same direction as the velocity of the receiving aircraft. The term velocity as used herein denotes a vector quantity and not the scalar quantity of speed.

A negative voltage $-e_{s_{x_1}}$ proportional to the magnitude of the air speed of the receiving aircraft is summed in the amplifier 96 with the longitudinal speed voltage $e_{s_{x_2}}$ in the output circuit of the resolver 80 to provide a voltage in the output circuit of the amplifier 96 which represents the difference between the magnitude of the absolute magnitude of the longitudinal component of the speed of the transmitting aircraft $e_{s_{x_2}}$ and the absolute magnitude of the speed of the receiving aircraft $e_{s_{x_1}}$. Thus, two voltages $e_{s_{y_2}}$ and $(e_{s_{x_2}}-e_{s_{x_1}})$ are provided which represent the Cartesian coordinates of the relative velocity between the transmitting and the receiving aircraft as measured in the coordinants of the receiving air frame. The resolver 94 in conjunction with the amplifier 98 and the motor 100 transforms these two voltages $e_{s_{y_2}}$ and $(e_{s_{x_2}}-e_{s_{x_1}})$ which represent the Cartesian coordinants of the relative velocity into polar coordinants so that the rotatable shaft position of the resolver 94 represents the heading of this relative velocity and the output $e_v$ of the resolver represents the magnitude of the relative velocity. To accomplish this transformation from rectangular to polar coordinants the output or error voltage $e_n$ from the resolver 94 is utilized to excite the motor 100 by means of the amplifier 98 which in turn drives the rotatable shaft of the resolver 94 until the output voltage $e_n$ is equal to zero. This particular shaft position of the motor 100 and of the resolver 94 represents the orientation or direction of the relative velocity relative to the air frame or the heading of the receiving aircraft. Such resolver-servo systems as the resolver 94, the amplifier 98 and the motor 100 are well known in the art. The other output voltage $e_v$ of the resolver 94 represents the magnitude of the relative velocity and is fed to the amplifier 98 for controlling the gain of this amplifier. This voltage $e_v$ is also fed to the closing rate meter 105 by means of a switch 106.

The direction of the line of sight is determined by positioning the loop antenna 110 until it receives a zero or minimum signal from the transmitting aircraft. Assuming that the loop antenna 110 has not been positioned to receive this minimum signal, then it receives the transmitted signal from the transmitting aircraft and feeds this signal to the receiver 112. The receiver 112 is normally biased off or rendered inoperative so that it cannot receive until the gating pulses from the pulse generators 70 and 72 which activate the speed and heading channels of the decoder-computer provide the trigger pulses which unblank or render this receiver operative. Hence, the receiver 112 is rendered operative only during the time that a signal is being received by the computer. Thus, the direction finding unit will not "home" on any other aircraft in the vicinity of the receiving aircraft but will "home" on the same signal that is being decoded and fed to the computer. The signal received by the receiver 112 is fed to the detector 114 to be envelope-detected thereby and is then fed to the pulse stretcher 116 for producing a constant D.C. voltage in the output circuit of the pulse stretcher. This D.C. voltage is fed to the amplifier 118 and then used to drive the motor 107 which is mechanically coupled to the loop antenna 110. Consequently, the motor 107 turns the antenna 110 until the signal received by this antenna is at a minimum or until the axis of least sensitivity of the antenna's radiation pattern points at the transmitting aircraft. Thus, the steady state position of the shaft of the motor 107 is representative of the direction of the line of sight between the transmitting and receiving aircraft.

The output shaft of the resolver 94 representing the direction or heading of the relative velocity between the transmitting and receiving aircraft is subtracted from the direction of the line of sight in the differential gearing unit 102. The gearing unit 102 actuates the switch 106 when the difference between the transmitting and receiving aircraft is within a few degrees. In such event a collision between the two aircraft may be imminent and the switch 106 energizes the warning light 109, the buzzer 111 and connects the closing speed indicator 105 to the output circuit 95 of the resolver 94. A turning command may also be given by means of the turning command unit 104 to maneuver the plane to avoid the collision or merely advise the pilot by audible means or otherwise of the proper maneuver to alleviate the threat of the oncoming collision.

Figure 5:
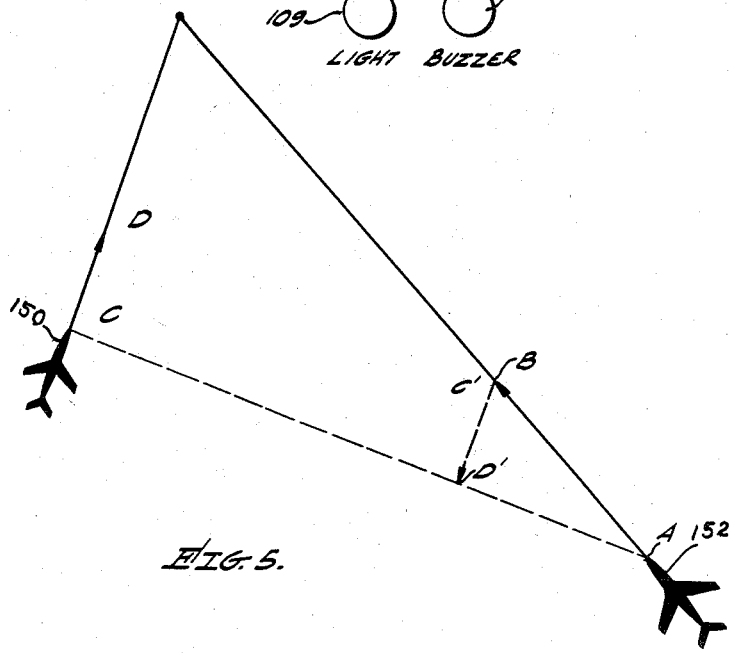
Fig. 5 is a vector diagram illustrating the relative velocity and the direction of the line of sight of two aircraft that are on a collision course.

Referring now to Fig. 5, there is shown two aircraft 150 and 152 that are on a collision course. A vector AB represents the velocity of the aircraft 152 and a vector CD represents the velocity of the aircraft 150. Assuming that the aircraft 150 is equipped with the receiver, decoder and computer unit of Fig. 2 and that the aircraft 152 is equipped with the transmitter of Fig. 1, then the receiving aircraft 150 computes the relative velocity between the two aircraft. This relative velocity is easily derived by subtracting the vector CD from the vector AB or as is shown by adding a vector C'D' which is equal to —CD to the vector AB. The direction of the relative velocity vector AD' is next compared with the direction of the line of sight AC between the two aircraft. The receiving aircraft thus computes a probable collision and the turning command unit advises the pilot of the aircraft 150 of the proper maneuver to avoid the oncoming collision.

If both aircraft 150 and 152 are equipped with a transmitter and receiver, then both planes can maneuver to avoid the oncoming collision. While the present invention may protect two aircraft from a collision where one of the aircraft is equipped with a transmitter for transmitting its altitude, speed and heading and the other aircraft is equipped with a receiver, decoder and computer, the most optimum protection can be effected only by equipping each aircraft in flight with such a transmitter and receiver. However, if economical conditions are such that it is not feasible to equip each aircraft with a transmitter and receiver, then the slower speed aircraft could be equipped with only a transmitter and the high speed aircraft equipped with both units. Under these circumstances the high speed aircraft would be protected against collisions with the slow speed and other high speed aircraft. The slow speed aircraft would have to rely on the operator's visibility for protection against collision with other slow speed aircraft.

To prevent signals from other aircraft in the area that are transmitting signals representative of their altitude, speed and heading from entering the receiver, decoder and computer unit of Fig. 2 while the system is computing on the speed and heading of a particular transmitting aircraft, the receiver 50 is blanked or rendered inoperative except when signals from the particular transmitting aircraft whose flight pattern is being analyzed by the computer are arriving. This blanking is accomplished by utilizing the trailing edge of the output pulse from the gating pulse generator 72 to trigger the receiver gate generator 51 in a suitable manner. Upon being triggered by the gating pulse generator, the gate generator 51 provides a blanking pulse in the output circuit thereof which blanks the receiver 50 until the next signal from the particular transmitting aircraft is scheduled to arrive. The time interval that the receiver 50 is rendered inoperative can easily be computed from the repetition rate of the repetition rate oscillator 36 utilized in the transmitter of Fig. 1.

The receiver 50 is also controlled to receive signals from other aircraft in the area after the direction finding antenna 112 has been positioned so that its null axis coincides with the direction of the line of sight if a collision course is not computed. At this time the rotation sensor 120 senses the zero rate of change of the rotation of the antenna 112 and generates a disabling signal for the gate generator 51. This disabling signal prevents the gate generator 51 from developing a blanking pulse in the output circuit thereof which will render the receiver 50 inoperative to receive signals from other aircraft in the vicinity. Therefore, once the direction finding antenna has been positioned to indicate the direction of the line of sight between the receiving aircraft and the particular aircraft whose flight pattern is being analyzed by the computer and a collision course between the receiving and particular transmitting aircraft is not present, the transmitted signals from other aircraft in the vicinity may be received by the receiver 50. The operation of the rotation sensor 120 of which one embodiment is disclosed in Fig. 3, will now be described.

The gear 130 is driven by the direction finding antenna 110 and in turn drives the gear 132. The conductive arm 134 is caused to engage either the contact 138 or the contact 140 depending upon the direction of rotation of the gear 133. As long as the antenna and the gear continue to rotate, the arm 134 engages either of the contacts and thus couples the output terminal 144 to the negative terminal of the battery 142. Hence, the output voltage that is measured between the terminal 144 and ground is negative as long as the direction finder antenna 110 is rotating but changes to zero or ground potential when the antenna 110 stops rotating and thereby causes the arm 134 to assume a neutral position and disengage the contact 138 or 140. In this manner, the rotation sensor 120 feeds a positive step voltage to the gate generator 51 which disables this gate generator as soon as the direction finding antenna 110 has been positioned so that its axis of minimum sensitivity is pointing at the transmitting aircraft.

In the event that the computer indicates that a collision between the receiving and the transmitting aircraft may be in the making, a disabling signal is fed to the rotation sensor 120 by means of the switch 106 so that the rotation sensor will not disable the receiver blanking gate generator 51. In this way the system is kept locked on signals from a transmitting aircraft which is colliding with the receiving aircraft until a collision prevention maneuver is effected.

To insure that the system is operative when airborne, the testing unit 42 may be manually operated by the operator of an aircraft or by any other suitable means to connect the transmitted signal through a suitable attenuator incorporated in the unit 42 into the receiver 50. This test signal which is fed to the receiver 50 has the identical altitude, speed and heading information which is fed into the computer by the instruments on the aircraft carrying the receiver and hence the shaft of the resolver 94 rotates until it assumes a position corresponding to the heading of this aircraft, e.g. the zero degrees position. The rotary switch 122 applies an electric signal to the second test unit 123 for causing this test unit to feed the transmitted signal from the first test unit to the receiver 112 until the null axis of this antenna is aligned with the direction of the line of flight of the aircraft carrying the receiver. Thus the difference between the direction of the line of sight and the direction of the relative velocity as analyzed by the computer will be zero. If the system is functioning properly, the light 109 will blink and the buzzer 111 will emit an audible sound. Also, the turning command actuator 104 will direct the pilot to make the appropriate maneuver or will automatically effect the maneuver itself since hypothetically the necessary conditions for a collision exist.

Figure 4:
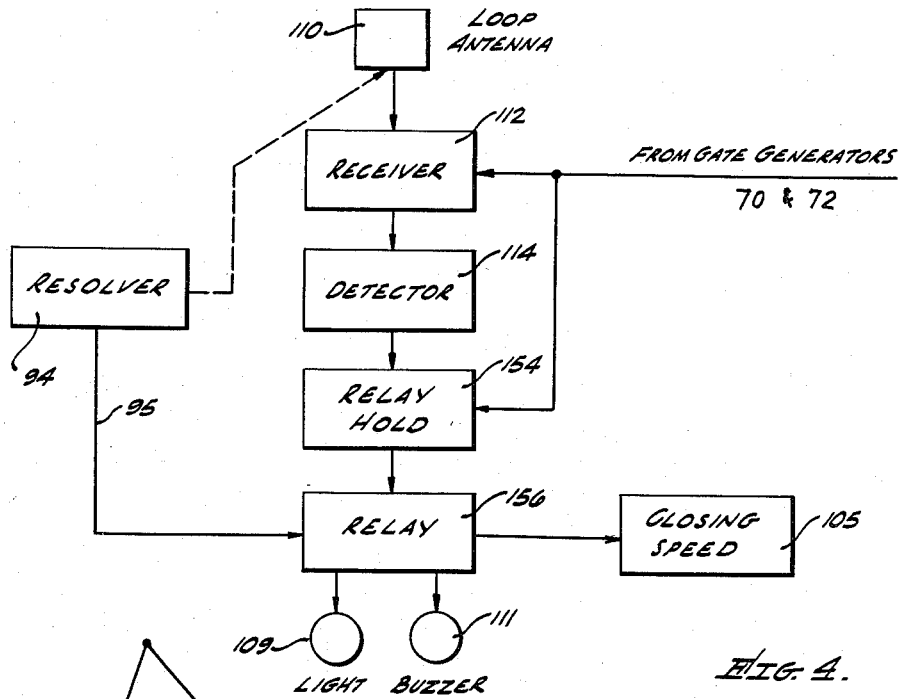
Fig. 4 is a block diagram of a portion of another embodiment of a computer utilizing the principles of the present invention.

Referring now to Fig. 4, another embodiment of a unit for determining whether the directions of the relative velocity and line of sight between two aircraft suitable for use in the computer of Fig. 2 is shown which includes the loop antenna 110, the receiver 112 and the detector 114. The output signal from the detector 114 is fed to a relay hold circuit 154 which may be a suitable bistable multivibrator. This signal causes the multivibrator to assume one stable state. The signal that is utilized to unblank the receiver 112 is also fed to the relay hold circuit 154 as shown to cause this circuit 154 to assume its other stable state. The output signal from the relay hold circuit is fed to a relay 156 which in turn controls the light 109 and the buzzer 111. The resolver 94 is mechanically coupled to the loop antenna 110 and the output circuit 95 thereof is connected to the relay 156 which in turn feeds the signal developed in the output circuit 95 to the closing speed indicator 105. The operation of this circuit is as follows:

The receiver 112 is rendered operative by appropriate gating or unblanking signals from the gate generators 70 and 72 when the receiver 50 and the decoder section of Fig. 2 have picked up a signal from transmitting aircraft which is within the predetermined range of altitudes of which a collision may occur. The receiver 112 is thereby rendered operative to receive the transmitted signals from the particular transmitting aircraft by the loop antenna 110. These signals are detected by the detector 114 and fed to the relay hold circuit or multivibrator 154. The gating signals from the generators 70 and 72 are also applied to the multivibrator. The multivibrator is designed to permit the signals from the detector 114 to overide the signals from the generators 70 and 72. The signals in the output circuit of the detector 114 cause the relay hold circuit or multivibrator 154 to assume a first stable state of operation. In this first state of operation, the relay hold circuit or multivibrator maintains the relay 156 de-energized which in turn prevents the warning light 109 and buzzer 111 from becoming energized. During this same time interval the resolver 94 is moving its rotatable shaft to correspond to the direction of the relative velocity between the transmitting and receiving aircraft. The shaft of the resolver 94 also aligns the loop antenna so that its axis of least sensitivity is aligned with the direction of the relative velocity between the two aircraft. If the direction of the line of sight and the direction of the relative velocity coincide or are within a predetermined range of degrees then the signal picked up by the antenna 110 is detected by the detector 114 is insufficient to maintain the hold relay 154 in its first stable state of operation. The signals from the gate generators 70 and 72 now trip the relay hold circuit 154 to its second state of stable operation in which state the hold circuit energizes the relay 156. This relay energizes the light and the warning buzzer and also couples the output circuit 95 of the resolver to the closing speed indicator 105.

In this arrangement, the line of sight between the transmitting and the receiving aircraft is not measured but the loop antenna 110 is aligned along the direction of the relative velocity between the two aircraft by means of the resolver 94. However, if the loop antenna is not aligned within a few degrees of the direction of the line of sight between the two aircraft, then a sufficient signal will be developed by the detector 114 to hold the relay circuit 154 in its first state of operation which prevents an alarm being given.

To limit the range of the system so that aircraft that are separated by great distances for example, 50 miles or more, will not be alarmed that they are on a collision course, the range of the system may be conveniently limited to something less than 20 or 30 miles. This is easily accomplished by adjusting the sensitivity of the receiver 50 or of the gate generator 70. Where the sensitivity of the gate generator 70 is adjusted, the altitude signal from the zero frequency detector 68 that will trigger the gate generator 70 may be selected so that the system will ignore a signal that does not exceed a predetermined value. To a first approximation the received signal varies inversely with the square of the distance or range between the transmitting and receiving aircraft. Since only a very broad range cut-off is necessary for the successful operation of the system, this type of range discrimination will be adequate for most purposes.

The foregoing disclosure represents one embodiment of the present invention and variations are obviously within its realm and scope. For example, the system may be adapted for protecting maritime vessels against collisions. In such a case, the variable parameter of altitude is not present. Also, the signals representative of the altitude, speed and heading of each aircraft could be received by ground-based radio communications equipment and utilized for the purpose of locating and plotting the courses of airplanes in flight as well as warning the aircraft themselves of possible collisions.

What is claimed is:

1. A system for preventing collisions between two vehicles comprising: first means including a transmitter carried by a first vehicle and adapted to periodically transmit signals representative of the speed and heading of said first vehicle; second means including a receiver carried by a second vehicle and adapted to selectively receive the signals transmitted by said first vehicle; third means including a computer carried by said second vehicle and responsive to the signals transmitted by said first vehicle and to signals representative of the speed and heading of said second vehicle for deriving the relative velocity between said first and second vehicle; fourth means carried by said vehicle for deriving the line of sight between the first and second vehicles and for determining whether the direction of said relative velocity is within a predetermined angle of the line of sight between said first and second vehicles, whereby said second vehicle may be warned of an oncoming collision if the direction of the relative velocity is within a few degrees of the direction of the line of sight between the two vehicles.

2. The system defined in claim 1 wherein said third means includes means for obtaining the angle between the heading of said first and second aircraft, means for obtaining the product of the sine of said angle and the speed of one of said first and second aircraft and means for obtaining the product of the cosine of said angle and the speed of said one aircraft, and means for subtracting the speed of the other aircraft from the sine component of the speed of said one aircraft.

3. The system defined in claim 1 wherein said fourth means includes a second receiver, an antenna having an axis of minimum sensitivity coupled to said receiver, means including said computing means for positioning said axis along the direction of said line of sight, and means for deriving an output signal from said second receiver when the angle between said directions is less than said predetermined angle.

4. The system defined in claim 1 wherein said third means includes means for obtaining the angle between the headings of said first and second aircraft, first resolving means for obtaining a sine component signal representative of the product of the sine of said angle and the speed of one of said first and second aircraft and a cosine component signal representative of the product of the cosine of said angle and the speed of said one aircraft, means for subtracting the signal characteristic of the speed of the other aircraft from said sine component signal and second resolving means responsive to said cosine component and to the difference between said sine component and the speed of said other aircraft for deriving the direction and magnitude of the relative velocity between said first and second aircraft.

5. A system for preventing collisions between two vehicles comprising: means including a transmitter carried by a first vehicle and adapted to periodically transmit signals representaive of the speed and heading of said first vehicle, receiver means carried by a second vehicle and adapted to selectively receive the signals transmitted by said first vehicle, means including a computer carried by said second vehicle and responsive to the signals transmitted by said first vehicle and to signals representative of the speed and heading of said second vehicle for deriving the relative velocity between said first and second vehicles, direction finding means carried by said second vehicle and adapted to derive the direction of the line of sight between said first and second vehicles and means carried by said second vehicle for comparing the direction of said relative velocity and the direction of said line of sight whereby said second vehicle may be appraised of an oncoming collision if said directions are within a predetermined range.

6. A system for preventing collisions between a plurality of aircraft in flight comprising: means including a transmitter carried by a first aircraft and adapted to code and periodically transmit coded signals characteristic of the altitude, speed and heading of said first aircraft, a receiver carried by a second aircraft and adapted to selectively receive the signals transmitted by said first aircraft, decoding means carried by said second aircraft and adapted to decode the coded signals received by said receiver, comparing control means carried by said second aircraft for comparing the signals characteristic of the altitude of said first aircraft and signals characteristic of the altitude of said second aircraft, receiver disabling means carried by said second aircraft under the control of said comparing control means and adapted to render said receiver inoperative during the time interval that said coded signals are not being transmitted by said first aircraft when the difference in the altitudes of said first and second aircraft are within a predetermined range, computing means carried by said second aircraft under the control of said comparing control means and responsive to the signals characteristic of the speed and heading of said first aircraft and to signals characteristic of the speed and heading of said second aircraft for establishing the direction of the relative velocity between said first and second aircraft and means carried by said second aircraft for determining whether the direction of said relative velocity is within a predetermined angle of the direction of the line of sight between said first and second aircraft, whereby an appropriate warning or maneuver may be effected with respect to said second aircraft if the angle between said directions is less than said predetermined angle.

7. The system defined in claim 6 wherein said computing means includes means for obtaining the angle between the headings of said first and second aircraft, means for obtaining the product of the sine of said angle and the speed of one of said first and second aircraft and means for obtaining the product of the cosine of said angle and the speed of said one aircraft, and means for subtracting the speed of the other aircraft from the sine component of the speed of said one aircraft.

8. The system defined in claim 6 wherein said means for determining whether the direction of said relative velocity is within a predetermined angle of the direction of the line of sight between said first and second aircraft includes a second receiver, an antenna having an axis of minimum sensitivity coupled to said receiver, means including said computing means for positioning said axis along the direction of said line of sight, and means for deriving an output signal from said second receiver when the angle between said directions is less than said predetermined angle.

9. The system defined in claim 6 wherein said computing means includes means for obtaining the angle between the headings of said first and second aircraft, first resolving means for obtaining a sine component signal representative of the product of the sine of said angle and the speed of one of said first and second aircraft and a cosine component signal representative of the product of the cosine of said angle and the speed of said one aircraft, means for subtracting the signal characteristic of the speed of the other aircraft from said sine component signal and second resolving means responsive to said cosine component and to the difference between said sine component and the speed of said other aircraft for deriving the direction and magnitude of the relative velocity between said first and second aircraft.

10. The system defined in claim 9 wherein means for determining whether the direction of said relative velocity is within a predetermined angle of the direction of the line of sight between said first and second aircraft includes a second receiver, an antenna having an axis of minimum sensitivity coupled to said receiver, means including said computing means for positioning said axis along the direction of said line of sight, and means for deriving an output signal from said second receiver when the angle between said directions is less than said predetermined angle.

11. A system for preventing collisions between two aircraft in flight comprising: means including a transmitter carried by a first aircraft and adapted to periodically transmit signals characteristic of the altitude, speed and heading of said first aircraft, receiver means carried by a second aircraft and adapted to selectively receive the signals transmitted by said first aircraft; computing means carried by said second aircraft and responsive to the received signals characteristic of the speed and heading of said first aircraft and to signals characteristic of the speed and heading of said second aircraft and adapted to derive the relative velocity between said first and second aircraft, direction finding means carried by said second aircraft and adapted to determine the direction of the line of sight between said first and second aircraft, comparing control means carried by said second aircraft for comparing the altitudes of said first and second aircraft and for rendering said computing means and said direction finding means operative when the difference in altitude between said first and second aircraft is within a predetermined range and means including said comparing control means carried by said second aircraft inhibiting operation of said receiver during the increments of time when said transmitter is not transmitting, means for comparing the direction of said relative velocity and the direction of said line of sight whereby an appropriate warning or maneuver may be effected with respect to said second aircraft if the directions of said relative velocity and said line of sight are within a predetermined angle, and means for reestablishing operation of said receiver when the angle between the directions of said relative velocity and said line of sight exceeds a predetermined angle.

12. A system for preventing collisions between a plurality of aircraft in flight comprising: means including a transmitter carried by a first aircraft and adapted to code and periodically transmit coded signals characteristic of the altitude, speed and heading of said first aircraft, a receiver carried by a second aircraft and adapted to selectively receive the signals transmitted by said first aircraft, decoding means carried by said receiver, comparing control means carried by said second aircraft for comparing the signals characteristic of the altitude of said first aircraft and signals characteristic of the altitude of said second aircraft, receiver disabling means carried by said second aircraft under the control of said comparing control means and adapted to render said receiver inoperative during the time interval that said coded signals are not being transmitted by said first aircraft, computing means carried by said second aircraft responsive to the signals characteristic of the speed and heading of said first aircraft and to signals characteristic of the speed and heading of said second aircraft for establishing the relative velocity between said first and second aircraft, means for determining whether the direction of said relative velocity is within a predetermined angle of the direction of the line of sight between said first and second aircraft and means under the control of said last named means for inhibiting operation of said receiver disabling means when said direction finding means has established the line of sight between said first and second aircraft and the difference between the directions of said line of sight and said relative velocity exceeds a predetermined amount.

13. A system for preventing collisions between a plurality of aircraft in flight comprising: means including a transmitter carried by a first aircraft and adapted to code and periodically transmit coded signals characteristic of the altitude, speed and heading of said first aircraft, a receiver carried by a second aircraft and adapted to selectively receive the signals transmitted by said first aircraft, decoding means carried by said second aircraft and adapted to decode the coded signals received by said receiver, comparing control means carried by said second aircraft for comparing the signals characteristic of the altitude of said first aircraft and signals characteristic of the altitude of said second aircraft, receiver disabling means carried by said second aircraft under the control of said comparing control means and adapted to render said receiver inoperative during the time interval that said coded signals are not being transmitted by said first aircraft, computing means carried by said second aircraft responsive to the signals characteristic of the speed and heading of said first aircraft and to signals characteristic of the speed and heading of said second aircraft for establishing the relative velocity between said first and second aircraft, direction finding means, carried by said second aircraft under the control of said comparing control means for establishing the direction of the line of sight between said first and second aircraft, direction comparing means for comparing the directions of said line of sight and said relative velocity and means under the control of said direction finding means and said direction comparing means for inhibiting operation of said receiver disabling means when said direction finding means has established the line of sight between said first and second aircraft and the difference between the directions of said line of sight and said relative velocity exceeds a predetermined amount.

14. The system defined in claim 13 wherein said computing means includes means for obtaining the angle between the headings of said first and second aircraft, means for obtaining the product of the sine of said angle and the speed of one of said first and second aircraft and means for obtaining the product of the cosine of said angle and the speed of said one aircraft, and means for subtracting the speed of the other aircraft from the sine component of the speed of said one aircraft.

15. The system defined in claim 13 wherein said direction finding means includes a second receiver, an antenna having an axis of minimum sensitivity coupled to said receiver, means under the control of said comparing control means adapted to render said second receiver inoperative during the time interval that said coded signals are not being transmitted by said first aircraft, and means responsive to an output signal from said second receiver for turning said antenna until a minimum signal is received by said second receiver from said first aircraft thereby to align said axis of minimum sensitivity with the direction of the line of sight between said first and second aircraft.

16. In a system for protecting aircraft from mid-air collisions wherein each aircraft is equipped with a transmitter for transmitting pulses of energy characteristic of its altitude, speed and heading, a receiver for receiving such transmitted pulses from other aircraft in a predetermined area, comparing control means for comparing the altitude of the aircraft whose pulses are being received with its altitude, computing means for deriving the relative velocity between another aircraft and itself if the two aircraft are at approximately the same altitudes, and means to determine whether the direction of this relative velocity is within a predetermined angle of the direction of the line of sight between the two aircraft, the combination comprising: on each aircraft to be protected, communication means including a transmitter and a receiver, means including said transmitter for coding signals characteristic of the altitude, speed and heading of the aircraft carrying said transmitter and periodically transmitting said coded signals, means including said receiver for selectively receiving and decoding the coded signals transmitted by other aircraft within a predetermined area, comparing control means for comparing the received signals characteristic of the altitude of another aircraft and signals characteristic of the altitude of the receiving aircraft and adapted to produce an output signal when the difference between said altitudes is within a predetermined range, receiver disabling means under the control of said comparing control means adapted to inhibit operation of said receiver during the time interval that said coded signals are not being transmitted by the particular transmitting aircraft whose signals are being received by said receiver in response to said output signal, computing means under the control of said comparing control means and responsive to the received signals characteristic of the speed and heading of said particular transmitting aircraft and to signals characteristic of the speed and heading of the receiving aircraft for obtaining the relative velocity between said transmitting and receiving aircraft when the difference between the altitudes of said aircraft is within said predetermined range, means for determining whether the direction of said relative velocity is within a predetermined angle of the direction of the line of sight between said receiving aircraft and said particular transmitting aircraft, whereby an appropriate warning or maneuver may be effected with respect to said receiving aircraft if said directions are within said predetermined angle, and means for rendering said receiver operative to receive signals from other aircraft within said predetermined area when said directions are not within said predetermined angle.

17. In a system for protecting aircraft from mid-air collisions in which each aircraft is equipped with a transmitter, for periodically transmitting pulses characteristic of its altitude, speed and heading, a receiver for receiving such transmitted pulses from other aircraft in a predetermined area, comparing control means for comparing the altitude of the aircraft whose pulses are being received with its altitude, computing means for deriving the relative velocity between another aircraft and itself if the two aircraft are at approximately the same altitudes and means to determine whether the direction of this relative velocity is within a predetermined angle of the line of sight between the two aircraft the combination comprising: on each aircraft to be protected, communication means including a transmitter and a first receiver, means including said transmitter for coding signals characteristic of the altitude, speed and heading of the aircraft carrying said transmitter and periodically transmitting said coded signals, means including said receiver for selectively receiving and decoding the coded signals transmitted by other aircraft within a predetermined area, comparing control means for comparing the received signals characteristic of the altitude of another aircraft and signals characteristic of the altitude of the aircraft carrying said receiver and adapted to produce an output signal when the difference between said altitudes is within a predetermined range, receiver disabling means coupled between said comparing control means and said receiver for rendering said receiver inoperative during the time interval that said coded signals are not being transmitted by the aircraft whose signals are being received by said receiver in response to said output signal, computer means under the control of said comparing control means and responsive to the received signals characteristic of the speed and heading of the other aircraft and to signals characteristic of the speed and heading of the aircraft carrying the receiver for obtaining the relative velocity between the two aircraft when the difference between the altitudes of said aircraft is within said predetermined range, direction finding means under the control of said comparing control means for establishing the direction of the line of sight between the aircraft whose signals are being received and the aircraft carrying the receiver in response to said output signal direction comparing means for comparing the direction of said line of sight and the direction of said relative velocity and means under the control of said direction finding means and said direction comparing means for inhibiting operation of said receiver disabling means when said direction finding means has established said line of sight and the difference between the directions of said line of sight and said relative velocity exceeds a predetermined angle, whereby said receiver is rendered operative to receive signals from other aircraft if a collision course is not computed.

18. The system defined in claim 17 wherein said direction finding means includes a second receiver, an antenna having an axis of minimum sensitivity coupled to said receiver, means under the control of said comparing control means adapted to render said second receiver inoperative during the time interval that said coded signals are not being transmitted by said first aircraft, and means responsive to an output signal from said second receiver for turning said antenna until a minimum signal is received by said second receiver from said first aircraft thereby to align said axis of minimum sensitivity with the direction of the line of sight between said first and second aircraft.

19. The system defined in claim 18 which includes testing means for applying at least a portion of the output coded signals from said transmitter to said first receiver and means for turning said antenna until its axis of minimum sensitivity is aligned with the heading of the aircraft carrying said transmitter and first receiver.

20. In a system for preventing collisions between a plurality of aircraft the combination which comprises, on each aircraft to be protected, transmitting means for transmitting signals representative of the altitude, speed and heading of the respective aircraft, receiving means for selectively receiving the signals transmitted by other aircraft, means including computing means responsive to the signals received by the receiving means and to the speed and heading of the respective aircraft for deriving the relative velocity between the respective aircraft and another aircraft means for deriving the line of sight between the respective aircraft and the other aircraft and means for determining whether the direction of said relative velocity is within a predetermined angle of the line of sight between the respective aircraft and the other aircraft, whereby the respective aircraft may be warned of an oncoming collision if the direction of the relative velocity is within a predetermined angle of the direction of the line of sight.

21. In a system for preventing collisions between two vehicles the combination which comprises transmitting means carried by each of the vehicles for transmitting signals indicative of the speed and heading of the respective vehicles, receiving means carried by each of the vehicles for receiving signals transmitted by the other vehicle, and means including computing means carried by each vehicle and responsive to the signals received by the receiving means and to the speed and heading of the respective vehicle for deriving the relative velocity between the two vehicles.

References Cited in the file of this patent

UNITED STATES PATENTS 2,568,568    Stansbury _____ Sept. 18, 1951

Notice of Adverse Decision in Interference

In Interference No. 91,671 involving Patent No. 2,933,726, J. O. Campbell and Y. J. Liu, System and apparatus for preventing collisions between vehicles, final judgment adverse to the patentees was rendered Jan. 10, 1964, as to claims 1, 5, 20 and 21.

[*Official Gazette April 28, 1964.*]